US009766654B2

(12) United States Patent
Kuwajima et al.

(10) Patent No.: US 9,766,654 B2
(45) Date of Patent: Sep. 19, 2017

(54) LIQUID CRYSTAL DISPLAY DEVICE

(75) Inventors: Yuka Kuwajima, Mobara (JP); Eiji Oohira, Mobara (JP)

(73) Assignees: JAPAN DISPLAY INC., Tokyo (JP); PANASONIC LIQUID CRYSTAL DISPLAY CO., LTD., Hyogo-ken (JP)

( * ) Notice: Subject to any disclaimer, the term of this patent is extended or adjusted under 35 U.S.C. 154(b) by 1126 days.

(21) Appl. No.: 12/575,508

(22) Filed: Oct. 8, 2009

(65) Prior Publication Data

US 2010/0090972 A1 Apr. 15, 2010

(30) Foreign Application Priority Data

Oct. 9, 2008 (JP) .................. 2008-263026

(51) Int. Cl.
  G06F 1/16 (2006.01)
  G02F 1/1333 (2006.01)
(52) U.S. Cl.
  CPC ........ G06F 1/1626 (2013.01); G02F 1/13338 (2013.01); G06F 1/1637 (2013.01); G06F 1/1643 (2013.01)
(58) Field of Classification Search
  CPC .................... G06F 3/0412; G06F 2203/04103
  USPC .................................. 345/173–178
  See application file for complete search history.

(56) References Cited

U.S. PATENT DOCUMENTS

| 6,304,251 | B1 * | 10/2001 | Ito et al. ................. 345/173 |
| 6,310,614 | B1 * | 10/2001 | Maeda et al. ............ 345/173 |
| 6,572,941 | B1 * | 6/2003 | Murakami et al. ........... 428/34 |
| 7,499,038 | B2 * | 3/2009 | Nishikawa et al. ......... 345/174 |
| 2001/0043291 | A1 * | 11/2001 | Kono et al. ................. 349/12 |
| 2003/0058225 | A1 * | 3/2003 | Kusuda et al. ............. 345/173 |
| 2006/0132450 | A1 * | 6/2006 | Yamada et al. ............ 345/173 |
| 2008/0062148 | A1 * | 3/2008 | Hotelling et al. ........... 345/174 |
| 2008/0165158 | A1 * | 7/2008 | Hotelling et al. ........... 345/174 |
| 2008/0173395 | A1 * | 7/2008 | David ....................... 156/280 |
| 2008/0246741 | A1 * | 10/2008 | Hinata ....................... 345/173 |
| 2009/0038734 | A1 * | 2/2009 | Matsuhira ............ G01N 21/958 156/64 |
| 2009/0086114 | A1 * | 4/2009 | Higuchi ............... G02F 1/13338 349/12 |
| 2009/0322696 | A1 * | 12/2009 | Yaakoby et al. ............ 345/173 |

FOREIGN PATENT DOCUMENTS

| CN | 201066418 | 5/2008 | |
| JP | 09-026852 | 1/1997 | |
| JP | 2002-370789 | 12/2002 | |
| JP | WO 2007063818 A1 * | 6/2007 | ......... G01N 21/8422 |
| JP | 2008-083491 | 4/2008 | |

* cited by examiner

*Primary Examiner* — Nicholas Lee
(74) *Attorney, Agent, or Firm* — Typha IP LLC

(57) ABSTRACT

There is disclosed a liquid crystal display device in which a touch panel and a front window are attached to a front surface of a liquid crystal display panel with a touch-panel flexible wiring substrate mounted to the touch panel. The front window is attached to the touch panel by an adhesive sheet. The touch panel and the front window may be peeled off in the vicinity of the portion in which the touch-panel flexible wiring substrate is mounted to the touch panel, due to mechanical shock. In order to prevent the peeling-off of the touch panel and the front window, protrusions are formed in the adhesive sheet to increase the adhesive force between the touch panel and the front window in this portion.

10 Claims, 8 Drawing Sheets

LIQUID CRYSTAL DISPLAY DEVICE

CLAIM OF PRIORITY

The present application claims priority from Japanese Patent Application JP 2008-263026 filed on Oct. 9, 2008, the content of which is hereby incorporated by reference into this application.

FIELD OF THE INVENTION

The present invention relates to a liquid crystal display device, and more particularly to a small display device having a touch panel and a front window provided on the outermost surface of the small display device used for cellular phones and the like.

BACKGROUND OF THE INVENTION

In a liquid crystal display device, a TFT substrate in which pixel electrodes, thin film transistors (TFTs), and the like are formed in matrix is disposed facing a color filter substrate in which color filters and the like are formed at positions corresponding to the pixel electrodes of the TFT substrate. Liquid crystal is provided between the TFT substrate and the color filter substrate. The liquid crystal display device controls the transmittance of light of the liquid crystal molecules for each pixel to form an image.

The liquid crystal display device can be reduced in size and thickness, and is used in a wide range of applications such as cellular phones. Recent cellular phones have a variety of applications. Further, input devices are also expected to have a function allowing finger input through a touch panel, in addition to the conventional key-button operation. In such a case, the touch panel is mounted on the side of the color filter substrate of the liquid crystal display panel.

Meanwhile, in the liquid crystal display device, there is a strong demand for reducing the thickness of the liquid crystal display panel, in addition to reducing the overall size of the set while keeping a certain size of the screen. The thickness of the liquid crystal display panel is reduced by polishing the outside of the liquid crystal display panel after production of the liquid crystal display panel. A liquid crystal display panel includes a TFT substrate in which pixel electrodes, thin film transistors (TFTs), and the like are formed, as well as a color filter substrate in which color filters are formed. The TFT substrate and the color filter substrate are glass substrates that are standardized, for example, to 0.5 mm or 0.7 mm. It is difficult to obtain such standardized glass substrates from the market. In addition, very thin glass substrates have a problem relating to mechanical strength and bending in the production process, leading to a reduction in the production yield. As a result, the liquid crystal display panel is formed with the standardized glass substrates, and then the outside of the liquid crystal display panel is polished to reduce the thickness of the liquid crystal display panel.

The reduction of the thickness of the liquid crystal display panel poses a problem of the mechanical strength. When a mechanical stress is applied to the display surface of the liquid crystal display panel, there is a risk that the liquid crystal display panel will be broken. The situation is the same with the liquid crystal display panel in which a touch panel is set when the touch panel is made of glass.

In order to prevent the liquid crystal display panel from being broken by outside force, a front window of resin or glass is attached to the screen side of the liquid crystal display panel. In this case, an air layer exists between the liquid crystal display panel and the touch panel, or between the touch panel and the front window. The transmittance of the light from the backlight is reduced by the reflection from the interface in this area.

In order to prevent this, JP-A No. 83491/2008 describes a configuration in which an adhesive layer or an anti-reflection coating is formed between the liquid crystal display panel and the touch panel or between the touch panel and the front window.

SUMMARY OF THE INVENTION

The technology described in JP-A No. 83491/2008 addresses the problem of reduction in the brightness of light reflected between the liquid crystal display panel and the touch panel, or between the touch panel and the front window. The touch panel and the front window are bonded by an adhesive sheet.

A touch-panel flexible wiring substrate is connected to the touch panel in order to supply electric current and signals to the touch panel. Thus, the adhesive sheet may not be provided in the vicinity of the area in which the touch-panel flexible wiring substrate is mounted. For this reason, the adhesive force between the touch panel and the front window is weaker in the vicinity of the touch-panel flexible wiring substrate than in the other portions. As a result, there is a problem that the touch panel and the front window are peeled off in this area when the liquid crystal display device is given shock.

Further, upon attachment of the adhesive sheet, air bubbles are likely to be entrained at a portion in which the adhesive sheet is first attached to the substrate. Up to now, such air bubbles have been formed within the display area, often resulting in defective products.

The present invention aims to solve the above problems, and to provide a liquid crystal display device having a touch panel and a front window with high reliability and high production yield.

The present invention overcomes the above problems. The specific configuration of the present invention is as follows.

(1) A liquid crystal display device includes a liquid crystal display panel and backlight housed in a resin mold, a touch panel attached to the liquid crystal display panel, and a front window attached to the touch panel. The touch panel and the front window are bonded by an adhesive sheet. A touch-panel flexible wiring substrate is connected to a specific side of the touch panel. In the vicinity of the specific side of the touch panel, the adhesive sheet is provided to surround a portion in which the touch-panel flexible wiring substrate is mounted to the touch panel.

(2) The liquid crystal display device described in (1), in which a thickness of the adhesive sheet is larger than a thickness of the touch-panel flexible wiring substrate.

(3) A liquid crystal display device includes a liquid crystal display panel and backlight housed in a resin mold, a touch panel attached to the liquid crystal display panel, and a front window attached to the touch panel. The touch panel and the front window are bonded by an adhesive sheet. A touch-panel flexible wiring substrate is connected to a specific side of the touch panel. In the vicinity of the specific side of the touch panel, the adhesive sheet has a first side parallel to the specific side, a first protrusion extending to the specific side, and a second protrusion extending to the specific side. The adhesive sheet is provided to surround a portion in which the touch-panel flexible wiring substrate is mounted to the touch panel, by the first side, the first protrusion, and the second protrusion at a predetermined distance.

(4) A liquid crystal display device includes a liquid crystal display panel and backlight housed in a resin mold, a touch panel attached to the liquid crystal display panel, and a front window attached to the touch panel. The touch panel and the front window are bonded by an adhesive sheet. The touch panel has a display area. A touch-panel flexible wiring substrate is connected to a specific side of the touch panel. In the vicinity of the specific side of the touch panel, the adhesive sheet has a first side parallel to the specific side, a first protrusion extending to the specific side, and a second protrusion extending to the specific side. The adhesive sheet is provided to surround a portion in which the touch-panel flexible wiring substrate is mounted to the touch panel, by the first side, the first protrusion, and the second protrusion at a predetermined distance. Air bubbles aligned parallel to the specific side exist in the first or second protrusion of the adhesive sheet, and the air bubbles aligned parallel to the specific side do not exist in the vicinity of the first side.

(5) The liquid crystal display device described in (4), in which the air bubbles are linearly aligned parallel to the specific side.

(6) The liquid crystal display device described in (4), in which the air bubbles formed in the first or second protrusion of the adhesive sheet in parallel to the specific side do not exist in the display area.

In a small liquid crystal display device formed by bonding a touch panel and a front window by an adhesive sheet and placing them on a liquid crystal display panel with backlight, it is possible to increase the adhesive force between the touch panel and the front window bonded by the adhesive sheet. Thus, it is possible to prevent peeling-off of the touch panel and the front window due to mechanical shock or other causes, after production of the liquid crystal display panel.

Further, even if air bubbles are formed in an end portion of the adhesive sheet when attached to the front window or the touch panel, it is possible to prevent the air bubbles from existing in the image display area.

DETAILED DESCRIPTION OF THE PREFERRED EMBODIMENT

Detailed contents of the present invention will be disclosed in accordance with an embodiment.

First Embodiment

Figure 1:
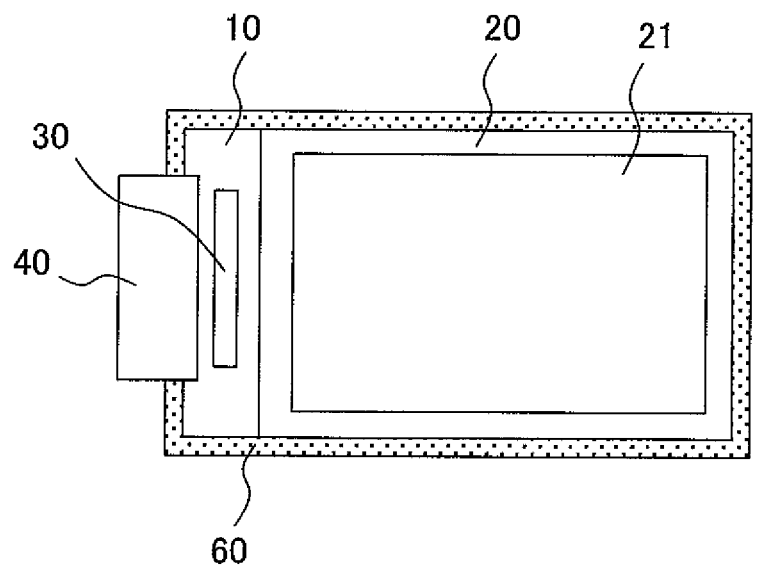
FIG. 1 is a plan view of a liquid crystal display device according to a first embodiment.

FIG. 1 is a plan view of a liquid crystal display panel used for cellular phones, and the like, according to the present invention. In FIG. 1, a color filter substrate 20 is provided on a TFT substrate 10. There is provided a liquid crystal layer, not shown, between the TFT substrate 10 and the color filter substrate 20. The TFT substrate 10 and the color filter substrate 20 are bonded by a sealing sheet, not shown, formed in the frame portion of the liquid crystal display panel. The TFT substrate 10 is formed to be larger than the color filter substrate 20. In a portion of the TFT substrate 10 extending beyond the color filter substrate 20, a terminal portion is formed to supply power, image signals, scan signals, and the like, to the liquid crystal display panel.

The terminal portion is provided with an IC driver 30 for driving scan lines, image signal lines, and the like. In the IC diver 30, a scan line drive circuit and an image signal drive circuit are formed. The IC driver 30 is supplied with scan signals as well as image signals through a main flexible wiring substrate 40 connected to the terminal portion.

An upper polarization plate 21 is attached to the upper side of the TFT substrate 10. The overall size of the upper polarization plate 21 is substantially equal to the display area. In other words, the liquid crystal can control only polarized light, so that a lower polarization plate is attached to the lower side of the TFT substrate 10 in order to polarize the light from the backlight into linearly polarized light. The linearly polarized light is modulated by the liquid crystal layer. The transmittance is changed for each pixel, and thus an image is formed. Then, the image is visible to human eyes when the light is polarized (analyzed) by the upper polarization plate 21.

The whole liquid crystal display panel is housed in a frame-like resin mold 60. On the lower side of the liquid crystal display panel in the resin mold 60, the backlight is also housed as described later. In FIG. 1, the main flexible wiring substrate 40 connected to the terminal portion of the liquid crystal display panel is folded over the back surface in an end portion of the resin mold 60. In this way, the overall size of the liquid crystal display device is reduced.

Figure 2:
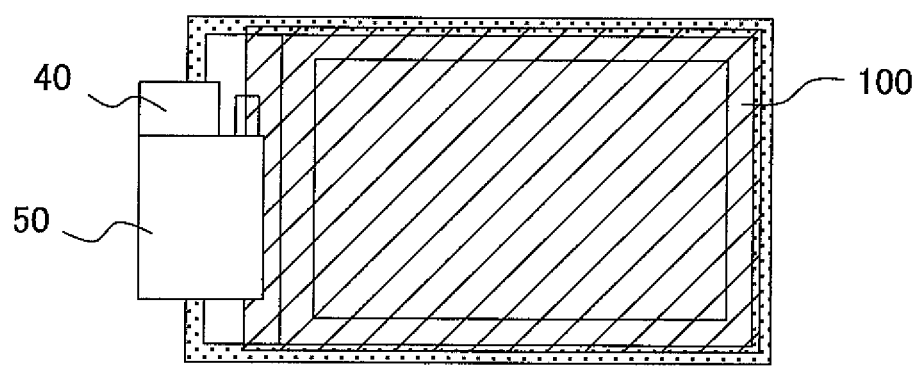
FIG. 2 is a plan view of the liquid crystal display device in which a touch panel is mounted.

FIG. 2 is a view of the liquid crystal display panel shown in FIG. 1 to which a touch panel 100 is bonded. The touch panel 100 is formed slightly larger than the color filter substrate 20 of the liquid crystal display panel, covering also part of the resin mold 60. In FIG. 2, a touch-panel flexible wiring substrate 50 is mounted to an end portion of the touch panel 100 in order to supply power and signals to the touch panel 100. The touch-panel flexible wiring substrate 50 is also folded over the back surface in the end portion of the resin mold 60, thereby reducing the overall size of the liquid crystal display device. It should be noted that the main flexible wiring substrate 40 and the touch-panel flexible wiring substrate 50 are connected to each other on the back surface of the resin mold 60.

In general, the substrate of the touch panel 100 is formed from glass. However, a plastic substrate may also be used if it is transparent and can sustain anneal temperatures for ITO, and the like. Examples of the transparent resin include acryl and polycarbonate.

The substrate of the touch panel 100 is attached to the color filter substrate 20 of the liquid crystal display panel by an adhesive material. In this embodiment, for example, an acrylic-based UV curable resin 110 is used as the adhesive material. The UV curable resin 110 initially is a liquid. The liquid crystal display panel and the touch panel 100 are bonded to each other in a reduced-pressure atmosphere, thereby preventing air bubbles from entering.

The UV curable resin 110 initially is a liquid, so that it is possible to uniformly attach the touch panel 100 to the liquid crystal display panel. In other words, after application of the adhesive material, the liquid crystal display panel and the touch panel 100 are bonded to each other in a reduced-pressure atmosphere. By bonding the liquid crystal display panel and the touch panel 100 in a reduced-pressure atmosphere, it is possible to prevent formation of air bubbles.

After bonding of the liquid crystal panel and the touch panel 100, ultraviolet (UV) rays are irradiated to the initially liquid UV curable resin 110 to cure the UV curable resin 110 and fix the touch panel 100 to the liquid crystal display panel. Because of such a process, the touch panel 100 can be uniformly bonded to the liquid crystal display panel.

The initially liquid UV curable resin 110 can be, for example, an acrylic resin containing 27% to 30% acrylic oligomer, in addition to UV reactive monomer, an additive for polymerization, and the like. The thickness of the cured adhesive material is about 50 microns.

In this case, the cured UV curable resin 110 is thermoplastic. In other words, this is because when defects such as air bubbles or foreign materials are found between the touch panel 100 and the liquid crystal display panel after the completion of the bonding process, the touch panel 100 is detached from the liquid crystal display panel for reproduction.

Figure 3:
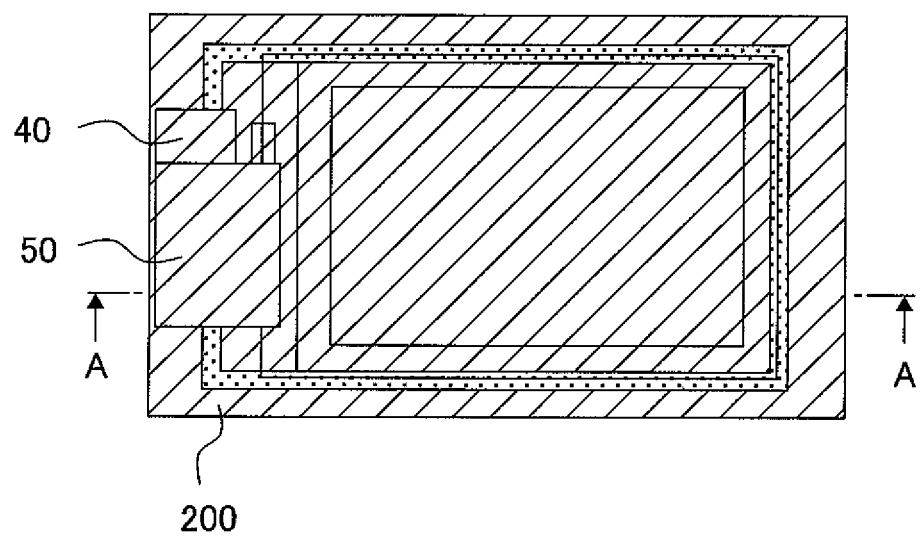
FIG. 3 is a plan view of the liquid crystal display device in which a front window is mounted.

FIG. 3 shows a state in which a front window 200 is mounted to the liquid crystal display panel in which the touch panel 100 is mounted as shown in FIG. 2. The front window 200 is generally formed from glass with a thickness of about 0.5 mm. Plastic such as acrylic resin and polycarbonate resin can also be used as the material of the front window 200.

When the front window 200 is mounted, the adhesive sheet 210 is provided between the touch panel 100 and the front window 200. In this case, the adhesive sheet 210 is formed on the side of the front window 200 to make the operation easier. In this case also, the adhesive sheet 210 is thermoplastic for the same reason as in the case of the UV curable resin 110 formed between the liquid crystal display panel and the touch panel 100.

In FIG. 3, the overall size of the front window 200 is larger than the liquid crystal display panel and the resin mold 60, covering the entire liquid crystal display panel and the like. Further, the front window 200 also covers the main flexible wiring substrate 40 mounted to the TFT substrate 10, as well as the touch-panel flexible wiring substrate 50 mounted to the touch panel 100.

Figure 4:
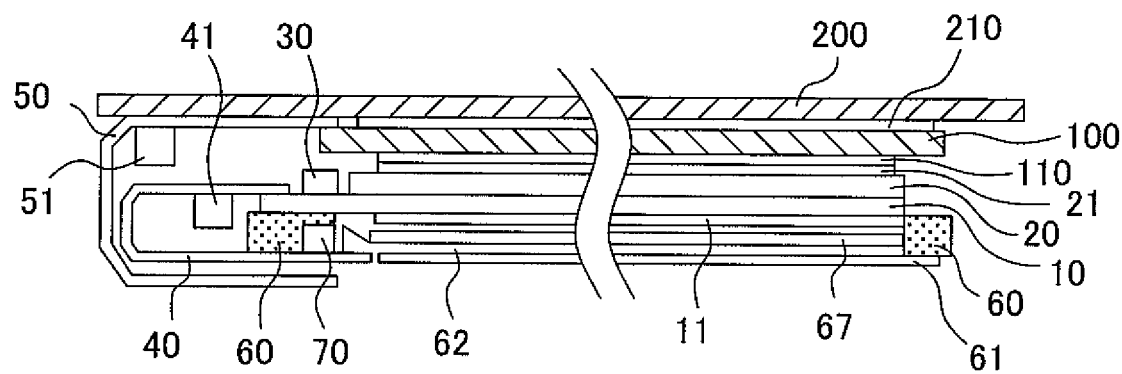
FIG. 4 is a cross-sectional view of FIG. 3.

FIG. 4 is a cross-sectional view taken along line A-A of FIG. 3. In the present specification, the combination of the TFT substrate 10 and the color filter substrate 20 is referred to as liquid crystal cell, and the liquid crystal cell in which a lower polarization plate 11 and an upper polarization plate 21 are bonded in the liquid crystal cell, is referred to as liquid crystal display panel. The touch panel 100 is bonded to the upper polarization plate 21 bonded to the color filter substrate 20, by the UV curable resin 110.

On the touch panel 100, the front window 200 is bonded by the adhesive sheet 210. There may be a case in which the front window 200 is formed from a plastic such as polycarbonate or acryl. The overall size of the front window 200 is large, covering the touch-panel flexible wiring substrate 50 as well as the main flexible wiring substrate 40.

The touch-panel flexible wiring substrate 50 is connected to the touch panel 100. The touch-panel flexible wiring substrate 50 is provided with an electronic component 51 for the touch panel 100. The electronic component 51 for the touch panel 100 is provided on the lower side of the flexible wiring substrate.

In FIG. 4, the IC driver 30 is provided in the terminal portion of the TFT substrate 10 of the liquid crystal cell. Further, the main flexible wiring substrate 40 is connected to a terminal formed in the TFT substrate 10. The main flexible wiring substrate 40 is folded over the back surface of the liquid crystal display panel.

An LCD electronic component 41 is mounted to the main flexible wiring substrate 40. In FIG. 4, the front window 200 is designed to also cover the LCD electronic component 41 mounted to the main flexible wiring substrate 40. It should be noted that the electronic component 41 is not necessarily mounted downward as shown in FIG. 4. The electronic component 41 may be provided upward in the portion of the flexible wiring substrate extending along the back surface of the backlight according to a layout.

In FIG. 4, the electronic component is provided on the lower side of the main flexible wiring substrate 40. At the same time, a light emitting diode 70 is also provided on the lower side of the main flexible wiring substrate 40, similarly to the other electronic component. However, the light emitting diode 70 is provided in a portion of the main flexible wiring substrate 40 folded over the back surface of the resin mold 60. In this way, the light emitting diode 70 can be housed in a concave portion formed in the resin mold 60, when the main flexible wiring substrate 40 is folded over the back surface of the resin mold 60. Then, as shown in FIG. 4, the light emitting diode 70 is provided facing an end portion of a light guide panel 62 to constitute a part of the backlight. In this embodiment, a white light emitting diode is used as the light emitting diode 70.

In FIG. 4, the liquid crystal display panel is placed on the resin mold 60. In FIG. 4, the lower polarization plate 11 of the liquid crystal display panel is housed in the resin mold 60, and the backlight is provided on the back surface of the lower polarization plate 11. The backlight has the following configuration.

The light guide panel 62 is provided so that the end portion thereof faces the light emitting diode 70. The role of the light guide panel 62 is to direct the light from the light emitting diode 70 entering from the side surface, towards the liquid crystal display panel. The size of the light emitting diode is large. Thus, the thickness of the whole liquid crystal display device is reduced by increasing the height of the light guide panel 62 at the portion facing the light emitting diode 70, and by reducing the thickness at the portion overlapped with an optical sheet described later.

In FIG. 4, a reflective sheet 61 is provided on the lower side of the light guide panel 62. This is in order to reflect and direct the light, which travels from the light guide panel 62 to the lower side, to the side of the liquid crystal display panel. On the upper side of the light guide panel 62, there are provided optical sheets 67 including a lower diffusion sheet 63, a lower prism sheet 64, an upper prism sheet 65, and an upper diffusion sheet 66.

Figure 5:
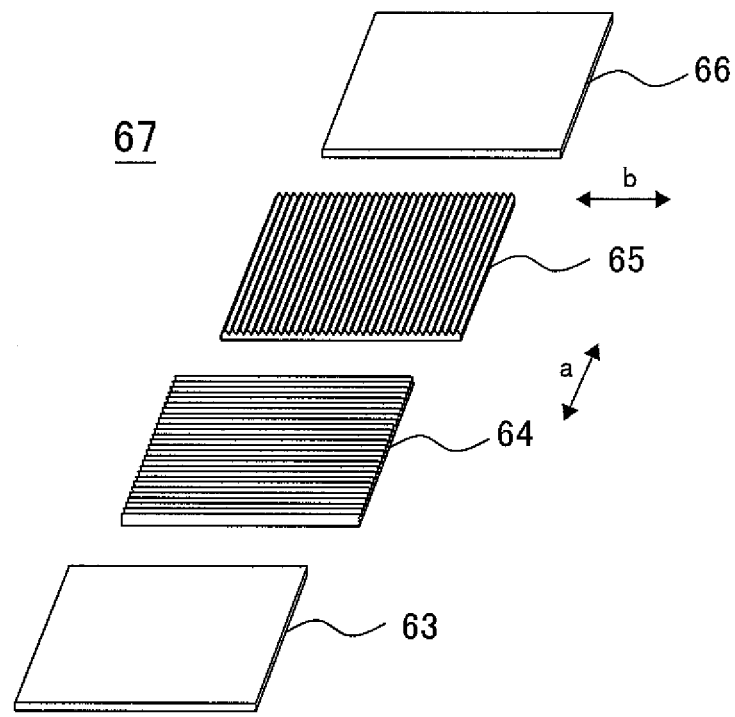
FIG. 5 is an exploded perspective view of optical sheets.

FIG. 5 is an exploded perspective view of the optical sheets 67. In FIG. 5, the lower diffusion sheet 63 is provided on the lowest side. As the light travels from the light guide panel 62 to the side of the liquid crystal display panel, the brightness varies such that the light is relatively bright near the light emission diode 70. The lower diffusion sheet 63 reduces the variation in brightness to form a uniform backlight.

The lower prism sheet 64 is provided on the lower diffusion sheet 63. The lower prism sheet 64 is configured, for example, such that prisms, each having a triangular section and extending in the horizontal direction, are arranged in the vertical direction as in FIG. 5. The pitch of each prism is about 50 μm. In FIG. 5, the lower prism sheet 64 has a role to increase the use efficiency of the light spreading in the a direction, by directing the light in the direction perpendicular to the lower prism sheet 64.

The upper prism sheet 65 is provided on the lower prism sheet 64. The upper prism sheet is configured, for example, such that prisms, each having a triangular section and extending in the vertical direction, are arranged in the horizontal direction as in FIG. 5. The pitch of each prism is about 50 μm. In FIG. 5, the upper prism sheet 65 has a role to increase the use efficiency of the light spreading in the b direction, by directing the light in the direction perpendicular to the upper prism sheet 65.

In FIG. 5, the upper diffusion sheet 66 is provided on the upper prism sheet 65. The upper diffusion sheet 66 has a role to prevent occurrence of moiré in a screen of the liquid crystal display device. In other words, the light output from the lower prism sheet 64 or the upper prism sheet 65 microscopically varies in brightness corresponding to the prism pitch on a periodic basis.

In the TFT substrate 10 of the liquid crystal display panel, for example, scan lines extending in the horizontal direction are arranged in the vertical direction. Thus, portions allowing light to pass through, and portions blocking light from passing through are periodically generated in the vertical direction by the scan lines. Further, image signal lines extending in the vertical direction are arranged in the horizontal direction. Thus, portions allowing light to pass through, and portions blocking light from passing through are periodically generated in the horizontal direction by the image signal lines.

As a result, light interference occurs between the light having passed through the lower prism sheet 64 and the upper prism sheet 65, and the TFT substrate 10 of the liquid crystal display panel, leading to the occurrence of moiré. The upper diffusion sheet 66 has a role to reduce the intensity of the light having passed through the prism sheets, reducing the interference with the scan lines or the image signal lines formed on the TFT substrate 10, and thereby preventing the occurrence of moiré.

Returning to FIG. 4, the optical sheets 67 are laminated on the light guide panel 62. A distance of about 50 μm is provided between the upper diffusion sheet 66 on the top of the optical sheets 67, and the lower polarization plate 11 of the liquid crystal display panel. This is to prevent scratches caused by friction between the lower polarization plate 11 and the upper diffusion sheet 66.

In FIG. 4, the main flexible wiring substrate 40 connected to the liquid crystal cell, and the touch-panel flexible wiring substrate 50 connected to the touch panel 100 are both folded over the back surface of the liquid crystal display panel. The main flexible wiring substrate 40 and the touch-panel flexible wiring substrate 50 are connected to each other in a portion not shown in FIG. 4.

Figure 6:
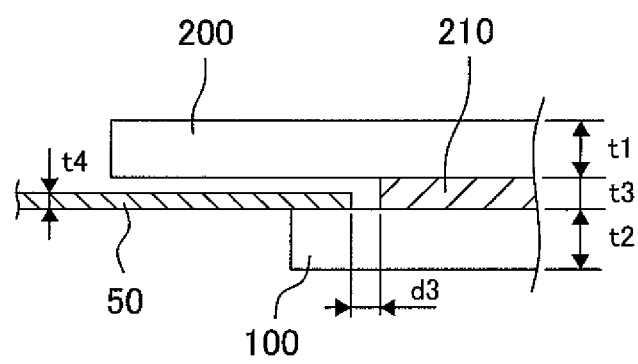
FIG. 6 is a cross-sectional view showing a bonding portion between the touch panel and the front window.

FIG. 6 is a cross-sectional view in the vicinity of the terminal of the touch panel 100, in which the front window 200 and the touch panel 100 are bonded to each other. In FIG. 6, the front window 200 and the touch panel 100 are bonded by the adhesive sheet 210. The touch-panel flexible wiring substrate 50 is connected at a distance d3 from the end portion of the adhesive sheet 210. Here, for example, a thickness t1 of the front window 200 is in the range of 0.5 to 1.1 mm, a thickness t2 of the touch panel 100 is in the range of 0.5 to 0.6 mm, a thickness t3 of the adhesive sheet 210 is about 0.1 mm, and a thickness of the touch-panel flexible wiring substrate 50 is about 0.07 mm, respectively.

Figure 7:
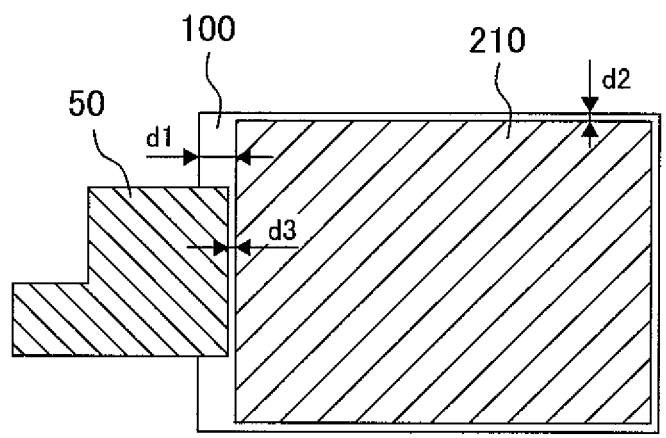
FIG. 7 is a plan view showing the relationship between the touch panel and an adhesive sheet in a conventional example.

FIG. 7 is a plan view showing the layout of the touch panel 100 and the adhesive sheet 210 without using the present invention. Although the front window 200 is actually provided on the adhesive 210, the front window 200 is omitted for clarity. In FIG. 7, a distance d2 between a side of the touch panel 100 and a side of the adhesive sheet 210 is in the range of 0.3 mm to 0.8 mm. A distance d1 between a side of the touch panel 100 and a side of the adhesive sheet 210 on the side in which the touch-panel flexible wiring substrate 50 is mounted, is in the range of 1.8 mm to 2.5 mm. Further, a distance d3 between an end portion of the touch-panel flexible wiring substrate 50 and an end portion of the adhesive sheet 210 is in the range of 0.8 mm to 1.0 mm.

As shown in FIG. 7, on the side in which the touch-panel flexible wiring substrate 50 is mounted, the distance d1 between the end portion of the touch panel 100 and the end portion of the adhesive sheet 210 is larger than on the other sides. For this reason, the adhesive force between the front window 200 and the touch panel 100 is small on this side.

As described above, when the adhesive sheet 210 is not present in the end portion of the touch panel 100, the front window 200 and the touch panel 100 are peeled off on this side due to shock applied to the liquid crystal display device, for example, when the liquid crystal display device is dropped.

Figure 8:
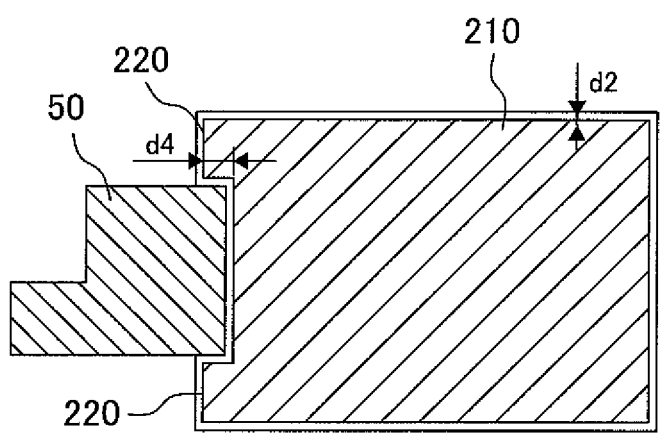
FIG. 8 is a plan view showing the relationship between the touch panel and the adhesive sheet in the present invention.

FIG. 8 is a plan view showing the layout of the touch panel 100 and the adhesive sheet 210 according to the present invention. Although the front window 200 is actually provided on the adhesive sheet 210, the front window 200 is omitted for clarity. In FIG. 8, the feature of the present invention is that the adhesive sheet 210 is provided with adhesive sheet protrusions 220 in the portion to which the touch-panel flexible wiring substrate 50 is not attached, on the side of the touch panel 100 in which the touch-panel flexible wiring substrate 50 is mounted. In other words, in FIG. 8, the adhesive sheet 210 is attached to surround the touch-panel flexible wiring substrate 50 in the portion in which the touch-panel flexible wiring substrate 50 is mounted to the touch panel 100.

By forming the adhesive sheet protrusions 220 as described above, the distance between the end portion of the touch panel 100 and the end portion of the adhesive sheet 210 on this side, is equal to the distance d2 of the other sides. Thus, it is possible to avoid the phenomenon that only the side of the touch panel 100 in which the touch-panel flexible wiring substrate 50 is mounted is easily peeled off due to shock. A length d4 of the portion of the adhesive sheet protrusion 220 is in the range of 1.0 mm to 1.5 mm.

In FIG. 8, the distance d2 between the end portion of the adhesive sheet 210 and the end portion of the touch panel 100 on the other sides of the touch panel 100, is the same as in FIG. 7. Further, the distance d3 between the end portion of the touch-panel flexible wiring substrate 50 and the end portion of the adhesive sheet 210 is the same as in FIG. 7.

As described above, by only providing the small protrusions in the adhesive sheet 210, it is possible to prevent the peeling-off of the touch panel 100 and the front window 200. Thus, the present invention is very effective. Since the length d4 of the adhesive sheet protrusion 220 is in the range of 1.0 mm to 1.5 mm, the influence of the material yield of the adhesive sheet 210 can be ignored.

In the conventional example, as shown in FIG. 7, the distance d1 between the end portion of the touch panel 100 and the end portion of the adhesive sheet 210 on the side in which the touch-panel flexible wiring substrate 50 is mounted, is larger than the distance on the other sides. Thus, the adhesive force between the front window 200 and the touch panel 100 is small on this side. The present invention shown in FIG. 8 addresses the above problem, and in particular, can prevent the phenomenon that the touch panel 100 and the front window 200 are peeled off when a mechanical shock is applied to the liquid crystal display device in the market.

Figure 9:
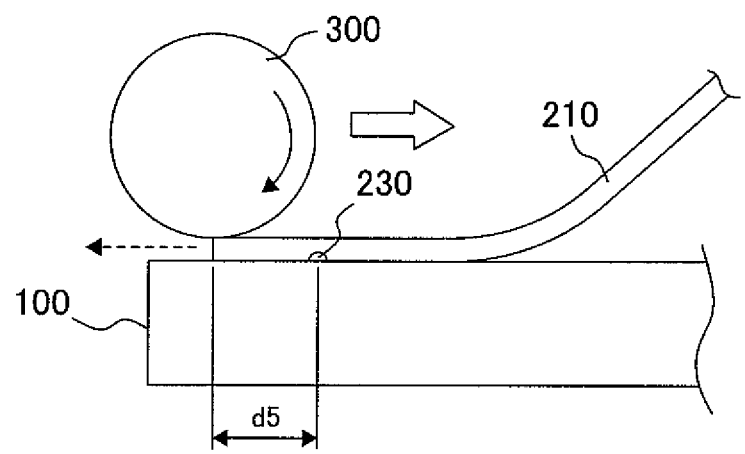
FIG. 9 shows an example of a way to attach the adhesive sheet by a roller.

Another effect of the present invention is as follows. The adhesive sheet 210 is attached to the touch panel 100 by using a roller 300, which is shown in FIG. 9. In the actual process, the adhesive sheet 210 is often first attached to the front window 200 by the roller 300, and then the front window 200 with the adhesive sheet 210 is bonded to the touch panel 100. However, to make the description simple in this specification, it is assumed that the adhesive sheet 210 is attached to the touch panel 100 by the roller 300, and then the front window 200 and the touch panel 100 are bonded to each other.

FIG. 9 is a view showing the state in which the adhesive sheet 210 is attached to the touch panel 100 by the roller 300. The attachment by the roller 300 is to prevent air bubbles 230 from being entrained between the adhesive sheet 210 and the touch panel 100. However, air bubbles are actually entrained, although to a reduced extent.

FIG. 9 is a schematic view showing the state in which the roller 300 lands in the end portion of the adhesive sheet 210 and starts attaching the adhesive sheet 210 to the touch panel 100. In FIG. 9, the roller 300 rotates as indicated by the arrow, moving in the direction of the white arrow to attach the adhesive sheet 210 to the touch panel 100. When the roller 300 lands in the end portion of the adhesive sheet 210, the end portion of the adhesive sheet 210 is pulled in the direction of the dotted arrow. At this time, defect occurs in the adhesive sheet 210 at a portion slightly inside from the end portion of the adhesive sheet 210, in which the air bubbles 230 are formed. A distance d5 from the end portion of the adhesive sheet 210 to the air bubbles 230 is about 1 mm in most cases.

Figure 10A:
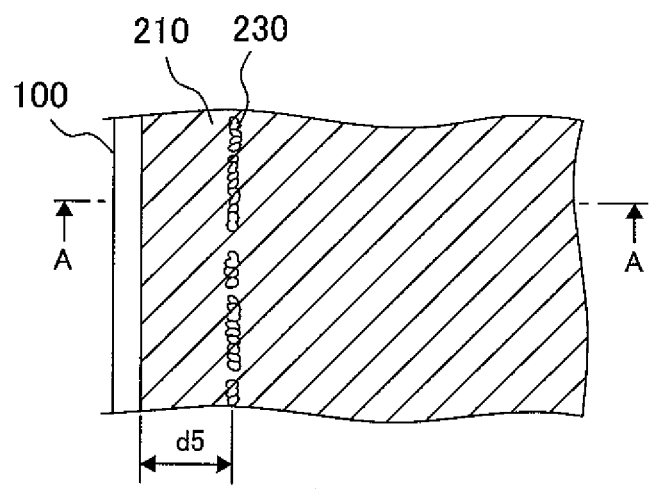
FIGS. 10A and 10B show an example of air bubbles formed when the adhesive sheet is attached by the roller.
Figure 10B:
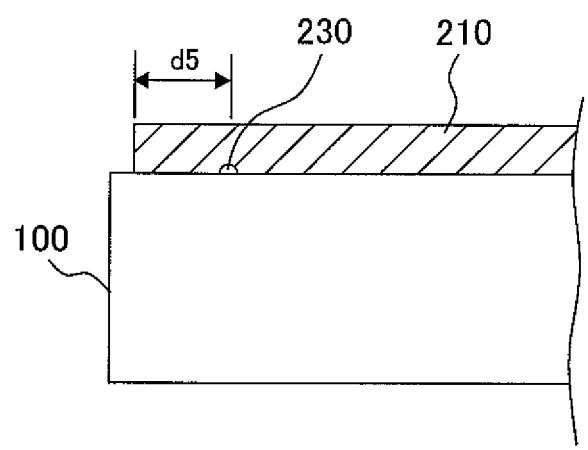

The air bubbles 230 formed due to attachment by the roller 300 have characteristics in their appearance. This situation is shown in FIGS. 10A and 10B. FIG. 10A is a plan view, and FIG. 10B is a cross-sectional view taken along line A-A of FIG. 10A. FIGS. 10A and 10B show the state in which the adhesive sheet 210 is attached to the touch panel 100 with the front window 200 omitted.

In FIG. 10A, many air bubbles 230 are formed in the vicinity of the end portion of the adhesive sheet 210, namely, at the position with the distance d5 from the end portion of the adhesive sheet 210. The small spherical or hemispherical air bubbles 230 are continuously formed due to attachment by the roller 300, appearing as linear air bubbles 230. FIG. 10B is a cross-sectional view showing that the hemispherical bubbles 230 are formed at the position with the distance d5 from the end portion of the adhesive sheet 210.

Figure 11:
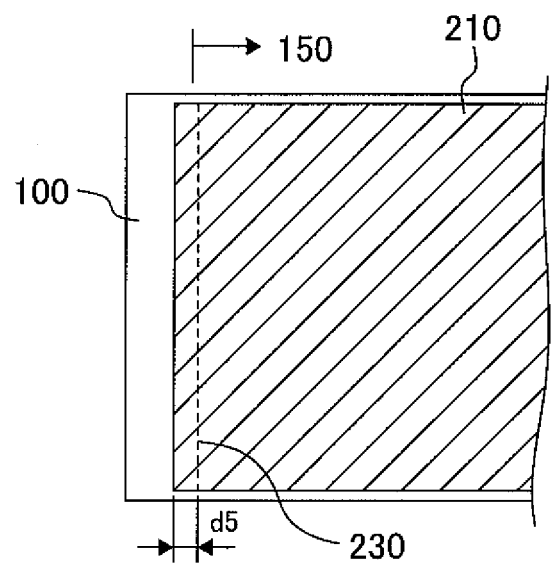
FIG. 11 shows an example of air bubbles formed on the adhesive sheet in the conventional example.

There is no problem when such air bubbles 230 are formed outside of a display area 150 of the liquid crystal display device. However, in the conventional example without using the present invention, the air bubbles 230 may be formed within the display area 150. This situation is shown in FIG. 11. FIG. 11 is a plan view showing the state of the air bubbles 230 occurring on the side in which the touch-panel flexible wiring substrate 50 is mounted to the touch panel 100.

In FIG. 11, the air bubbles 230 are formed in the vertical direction at the distance d5 from the end portion of the adhesive sheet 210. As the small liquid crystal display device is designed so that the overall size will be reduced with the display area 150 maximized, the so-called frame becomes small. In FIG. 11, the distance d5 is about 1 mm. In this case, the air bubbles 230 may appear within the display area 150. In FIG. 11, the root of the arrow is the end portion of the display area 150.

Figure 12:
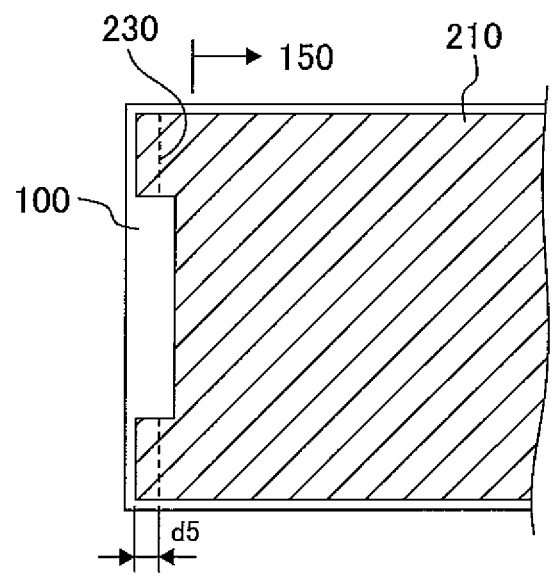
FIG. 12 shows an example of air bubbles formed on the adhesive sheet in the present invention.

FIG. 12 shows the position in which the air bubbles 230 are formed due to attachment of the adhesive sheet 210 by the roller 300 according to the present invention. In FIG. 12, the air bubbles 230 are formed at the position with a distance d5 from the end of the adhesive sheet protrusion 220 in which the roller 300 is first brought into contact with the adhesive sheet 210.

As shown in FIG. 12, the air bubbles 230 are formed in the adhesive sheet protrusion 220, outside the display area 150 in FIG. 12. In other words, the air bubbles 230 do not appear in the display area 150. Thus, it is possible to prevent the yield reduction due to the air bubbles 230, when the display area 150 is increased and the frame is reduced.

The foregoing description has focused on the case in which the adhesive sheet 210 is first attached to the touch panel 100 and then the front window 200 is bonded to the touch panel 100. However, the situation is the same when the adhesive sheet 210 is first attached to the front window 200 and then the touch panel 100 and the front window 200 are bonded to each other. In this case, however, the air bubbles are formed between the front window 200 and the adhesive sheet 210.

As described above, according to the present invention, it is possible to prevent the phenomenon that the front window 200 and the touch panel 100 are peeled off due to mechanical shock. Further, according to the present invention, it is possible to prevent the continuous air bubbles 230 formed due to attachment of the adhesive sheet 210 by the roller 300.

What is claimed is:
1. A liquid crystal display device comprising:
a liquid crystal display panel and backlight housed in a resin mold, wherein the liquid crystal display panel having an upper polarization plate on a liquid crystal cell, and the liquid crystal display panel having a display area;
a touch panel attached to the upper polarization plate by a UV curable resin, wherein the touch panel has a display area, and the UV curable resin extends over an entirety of the display area of the liquid crystal display panel; and
a front window attached to the touch panel;
wherein an upper surface of the touch panel and the front window are bonded by an adhesive sheet disposed therebetween;

wherein the adhesive sheet extends over an entirety of the display area of the touch panel at the upper surface of the touch panel;

wherein the front window has a thickness which is larger than a thickness of the touch panel;

wherein a touch-panel flexible wiring substrate is connected to a specific side of the touch panel at the upper surface of the touch panel; and wherein in the vicinity of the specific side of the touch panel, the adhesive sheet which extends over the display area of the touch panel at the upper surface of the touch panel between the touch panel and the front window is provided to surround without overlying a portion in which the touch-panel flexible wiring substrate is mounted to the upper surface of the touch panel, wherein in the vicinity of the specific side of the touch panel, the adhesive sheet having a first side parallel to the specific side and a second side parallel to the specific side, the second side is nearer to the specific side by a distance d4, and a third side opposing to the first side and the second side, wherein the adhesive sheet exists at both sides of the touch-panel flexible wiring substrate by distance d4, wherein when a width of the adhesive sheet between the second side and the third side is b and a width of the adhesive sheet between the first side and the third side is c, b is greater than c, and d4=b−c, wherein an edge of the front window extends further outward than an edge of the liquid crystal cell in the direction perpendicular to the specific side of the touch panel, and wherein the touch-panel flexible wiring substrate does not electrically connect with the front window.

2. The liquid crystal display device according to claim 1, wherein a thickness of the adhesive sheet is larger than a thickness of the touch-panel flexible wiring substrate.

3. A liquid crystal display device comprising:

a liquid crystal display panel and backlight housed in a resin mold, wherein the liquid crystal display panel having an upper polarization plate on a liquid crystal cell and the liquid crystal display panel having a display area;

a touch panel attached to the upper polarization plate by an UV curable resin, wherein the touch panel has a display area, and the UV curable resin extends over an entirety of the display area of the liquid crystal display panel; and a front window attached to the touch panel;

wherein an upper surface of the touch panel and the front window are bonded by an adhesive sheet disposed therebetween;

wherein the adhesive sheet extends over an entirety of the display area of the touch panel at the upper surface of the touch panel;

wherein the front window has a thickness which is larger than a thickness of the touch panel;

wherein a touch-panel flexible wiring substrate is connected to a specific side of the touch panel at the upper surface of the touch panel; and wherein in the vicinity of the specific side of the touch panel, the adhesive sheet which extends over the display area of the touch panel at the upper surface of the touch panel between the touch panel and the front window has a first side parallel to the specific side, a first protrusion extending to the specific side, and a second protrusion extending to the specific side, the adhesive sheet being provided to surround without overlying a portion in which the touch-panel flexible wiring substrate is mounted to the upper surface of the touch panel, by the first side, the first protrusion, and the second protrusion at a predetermined distance, wherein the first protrusion extends to the specific side of the touch panel by a distance d4, and the second protrusion extends to the specific side of the touch panel by a distance d4, wherein the adhesive sheet exists at both sides of the touch-panel flexible wiring substrate by the distance d4, wherein the adhesive sheet has a second side parallel to the specific side, the second side is nearer to the specific side by a distance d4, and a third side opposing to the first side and the second side, wherein when a width of the adhesive sheet between the second side and the third side is b and a width of the adhesive sheet between the first side and the third side is c, b is greater than c and d4=b−c, wherein an edge of the front window extends further outward than an edge of the liquid crystal cell in the direction perpendicular to the specific side of the touch panel, and wherein the touch-panel flexible wiring substrate does not electrically connect with the front window.

4. A liquid crystal display device comprising:

a liquid crystal display panel backlight housed in a resin mold, wherein the liquid crystal display panel having an upper polarization plate on a liquid crystal cell, and the liquid crystal display panel having a display area;

a touch panel attached to the upper polarization plate by an UV curable resin, wherein the touch panel has a display area, and the UV curable resin extends over an entirety of the display area of the liquid crystal display panel; and a front window attached to the touch panel;

wherein an upper surface of the touch panel and the front window are bonded by an adhesive sheet disposed therebetween;

wherein the adhesive sheet extends over an entirety of the display area of the touch panel at the upper surface of the touch panel;

wherein the front window has a thickness which is larger than a thickness of the touch-panel;

wherein a touch-panel flexible wiring substrate is connected to a specific side of the touch panel at the upper surface of the touch panel; and wherein in the vicinity of the specific side of the touch panel, the adhesive sheet which extends over the display area of the touch panel at the upper surface of the touch panel between the touch panel and the front window has a first side parallel to the specific side, a first protrusion extending to the specific side, and a second protrusion extending to the specific side, the adhesive sheet being provided to surround without overlying a portion in which the touch-panel flexible wiring substrate is mounted to the upper surface of the touch panel, by the first side, the first protrusion, and the second protrusion at a predetermined distance; and wherein air bubbles aligned parallel to the specific side exist in the first or second protrusion of the adhesive sheet, and the air bubbles aligned parallel to the specific side do not exist in the vicinity of the first side, wherein the first protrusion extends to the specific side of the touch panel by a distance $d4$, and the second protrusion extends to the specific side of the touch panel by a distance $d4$, wherein the adhesive sheet exists at both sides of the touch-panel flexible wiring substrate by a distance $d4$, wherein the adhesive sheet has a second side parallel to the specific side, the second side is nearer to the specific side by a distance $d4$, and a third side opposing to the first side and the second side, wherein when a width of the adhesive sheet between the second side and the third side is b and a width of the adhesive sheet between the first side and the third side is c, b is greater than c and $d4=b-c$, wherein an edge of the front window extends further outward than an edge of the liquid crystal cell in the direction perpendicular to the specific side of the touch panel, and wherein the touch-panel flexible wiring substrate does not electrically connect with the front window.

5. The liquid crystal display device according to claim 4, wherein the air bubbles are linearly aligned parallel to the specific side.

6. The liquid crystal display device according to claim 4, wherein the air bubbles formed in the first or second protrusion of the adhesive sheet in parallel to the specific side do not exist in the display area.

7. The liquid crystal display device according to claim 4, wherein the air bubbles exist in an area between the adhesive sheet and the touch panel, and wherein the front window has a thickness which is larger than a thickness of the touch panel.

8. The liquid crystal display device according to claim 4, wherein the display area is an image display area.

9. The liquid crystal display device according to claim 1, wherein the display area is an image display area.

10. The liquid crystal display device according to claim 3, wherein the display area is an image display area.

* * * * *